United States Patent
Faris et al.

(10) Patent No.: US 7,930,645 B2
(45) Date of Patent: Apr. 19, 2011

(54) SYSTEMS AND METHODS FOR PROVIDING A PERSISTENT NAVIGATION BAR IN A WORD PAGE

(75) Inventors: Andrew Boath Faris, Venice, CA (US); Anthony Dominic Amidei, Santa Monica, CA (US); Joshua Allen Rehling, Santa Monica, CA (US); Stephen Garcia, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 852 days.

(21) Appl. No.: 11/836,717

(22) Filed: Aug. 9, 2007

(65) Prior Publication Data

US 2009/0044142 A1     Feb. 12, 2009

(51) Int. Cl.
    *G06F 3/00* (2006.01)
(52) U.S. Cl. ........................................ 715/779
(58) Field of Classification Search ............ 715/779
    See application file for complete search history.

(56) References Cited

U.S. PATENT DOCUMENTS

| | | | |
|---|---|---|---|
| 6,630,943 B1 * | 10/2003 | Nason et al. | 715/746 |
| 6,677,964 B1 * | 1/2004 | Nason et al. | 715/764 |
| 6,973,057 B1 * | 12/2005 | Forslow | 370/328 |
| 7,669,140 B2 * | 2/2010 | Matthews et al. | 715/779 |
| 2002/0103789 A1 * | 8/2002 | Turnbull et al. | 707/3 |
| 2002/0186257 A1 * | 12/2002 | Cadiz et al. | 345/838 |
| 2005/0114789 A1 * | 5/2005 | Chang et al. | 715/779 |
| 2005/0198584 A1 * | 9/2005 | Matthews et al. | 715/779 |
| 2005/0246544 A1 * | 11/2005 | Moore et al. | 713/178 |
| 2006/0112339 A1 * | 5/2006 | Struthers et al. | 715/733 |
| 2006/0224662 A1 * | 10/2006 | Richardson et al. | 709/203 |
| 2007/0198946 A1 * | 8/2007 | Viji et al. | 715/779 |
| 2009/0150763 A1 * | 6/2009 | Griffith et al. | 715/230 |
| 2010/0002685 A1 * | 1/2010 | Shaham et al. | 370/352 |

\* cited by examiner

*Primary Examiner* — Ryan F Pitaro
(74) *Attorney, Agent, or Firm* — Martine Penilla & Gencarella, LLP

(57) ABSTRACT

Computer implemented methods for defining a navigation control, located inside of a shell of a word page are provided. The navigation control includes a plurality of dynamic controls defined as part of the navigation control. An associated dynamic control of the plurality of dynamic controls is associated with a tool and is configured to allow display of a user interface of the tool in an overlying window, without leaving the word page. The shell of the word page that includes a plurality of page modules is dynamically generated through a user action related to a word, and the plurality of page modules include content that is contextually related to the word. The overlying window is configured to be defined over one or more of the plurality of page modules. Further, the plurality of page modules are contextually related to the word when content of every page module in the plurality of page modules has some descriptive interrelated dependence to or from the word.

20 Claims, 5 Drawing Sheets

SYSTEMS AND METHODS FOR PROVIDING A PERSISTENT NAVIGATION BAR IN A WORD PAGE

CROSS REFERENCE TO RELATED APPLICATIONS

This application is related to co-pending: (1) patent application Ser. No. 11/836,724, filed on Aug. 9, 2007, entitled "Systems and Methods for Dynamic Page Creation", (2) patent application Ser. No. 11/836,723, filed on Aug. 9, 2007, entitled "Systems and Methods for Comments Aggregation and Carryover in Word Pages", (3) patent application Ser. No. 11/836,721, filed on Aug. 9, 2007, entitled "Systems and Methods for Providing Enhanced content Portability in a Word Page Module", and, (4) patent application Ser. No. 11/836,719, filed on Aug. 9, 2007, entitled "Systems and Methods for Providing a Multi-function Search Box for Creating Word Pages", each of which is incorporated herein by reference.

FIELD OF THE INVENTION

This invention generally relates to displaying information related to a given word. More specifically but without limitation, this invention relates to providing a navigation control in word pages of a word website.

BACKGROUND OF THE INVENTION

The computing industry has seen many advances in recent years, and such advances have produced a multitude products and services. Internet websites are examples of products and services, which are created to give users access to particular types of services, data, or searching capabilities. Today, websites can be readily created by most individuals desiring to post information or provide access or connectivity to other data. Websites are also created, updated, and supported to provide constantly updated current event information, news, and other information. This data is highly managed and processed so that its presentation can be easily displayed on web browsers or other Internet connected devices.

Currently to date, however, the traditional web sites provide mostly unstructured and contextually unrelated information to a user. For example, when a phrase is searched, resulting web page typically displays many links to external websites. These links to external websites are typically selected to be displayed on the web page based on phrase matching criteria without any consideration for user interactivity and/or contextual relationship with the searched phrase. Generally, the user is forced to visit many external websites associated with presented links to find more information about the searched phrase.

It is within this context that embodiments of the invention arise.

SUMMARY OF INVENTION

Broadly speaking, the present invention fills these needs by providing a persistent navigation bar in a word website to enable integration of collaboration and productivity enhancement tools and to provide navigational assistance to the users of the word website. In the word website, a unique word page is generated for each user entered or selected word. As used herein, a "word" is defined as relating to a concept, person, feeling etc. and functions as a carrier of meaning. The "word" may be a single word, a phrase, a name of person, event, place, phenomenon, method, etc. The word page includes one or more page modules. Each of the page modules include content that are contextually related to the user entered word.

The persistent navigation bar as described here is a navigation control that may include one or more tool controls. In one example, the navigation bar remains put when the word page is refreshed or reloaded. The navigation control can be used to enhance the user interactivity and usability of the word website. The navigation control is provided to enable integration of collaboration and productivity enhancement tools such as access to user's email boxes, instant messages (IM) mailboxes, ability to send IM from the navigation bar, access to social and business events calendar, etc. The users of the word website are able to access these most commonly used tools without leaving the word website. Hence, there is a need for methods and systems that provide a persistent navigation bar in the word page to enable integration of collaboration and productivity enhancement tools.

In one example, the shell of a word page includes one or more page modules, a multi-function search box, and a persistent navigation bar. While the content of the page modules in the word page continue changing based on the selected or entered word, the persistent navigation bar does not change visually with the changes in the content of the page modules.

In one embodiment, a computer implemented method for defining a navigation control, located inside of a shell of a word page is provided. The navigation control includes a plurality of dynamic controls defined as part of the navigation control. An associated dynamic control of the plurality of dynamic controls is associated with a tool and is configured to allow display of a user interface of the tool in an overlying window, without leaving the word page. The shell of the word page that includes a plurality of page modules is dynamically generated through a user action related to a word, and the plurality of page modules include content that is contextually related to the word. The overlying window is configured to be defined over one or more of the plurality of page modules. Further, the plurality of page modules are contextually related to the word when content of every page module in the plurality of page modules has some descriptive interrelated dependence to or from the word.

In another embodiment, a computer-implemented method for handling a navigation control, located inside of a shell of a word page is provided. The navigation control includes a plurality of page modules that are dynamically created through a user action defining a word and the plurality of page modules include content that is contextually related to the word. The navigation control on the display screen contains a plurality of dynamic controls in the shell of the word page. The method includes displaying the plurality of dynamic controls to display a user interface of tools associated with each of the plurality of dynamic controls, the user interface is configured to be displayed in an overlying window defined over one or more of the plurality of page modules. The method further includes associating each of the plurality of dynamic control with the tools. Further, the plurality of page modules are contextually related to the word when content of every page module in the plurality of page modules has some descriptive interrelated dependence to or from the word.

In another embodiment, a computer readable media having program instructions for executing a navigation control, located inside of a shell of a word page is provided. The navigation control includes a plurality of page modules that are dynamically created through a user action defining a word and the plurality of page modules include content that is contextually related to the word. The navigation control on the display screen contains a plurality of dynamic controls in the shell of the word page. The computer readable media includes program instructions for displaying the plurality of dynamic controls to display a user interface of tools associated with each of the plurality of dynamic controls, the user interface is configured to be displayed in an overlying window defined over one or more of the plurality of page modules. The computer readable media further includes program instructions for associating each of the plurality of dynamic control with the tools. Further, the plurality of page modules are contextually related to the word when content of every page module in the plurality of page modules has some descriptive interrelated dependence to or from the word.

The advantages of the present invention are numerous. Most notably, the system and apparatus described herein provide integration of collaborative tools and controls through the persistent navigation bar in the word page. Hence, the users of the word website can access their emails, instant messages, personal calendar, events calendar, and many other tools and controls without leaving the word website.

Other aspects and advantages of the present invention will become apparent from the following detailed description, taken in conjunction with the accompanying drawings, illustrating by way of example the principles of the present invention.

BRIEF DESCRIPTION OF DRAWINGS

The present invention will be readily understood by the following detailed description in conjunction with the accompanying drawings. To facilitate this description, like reference numerals designate like structural elements.

Figure 1:
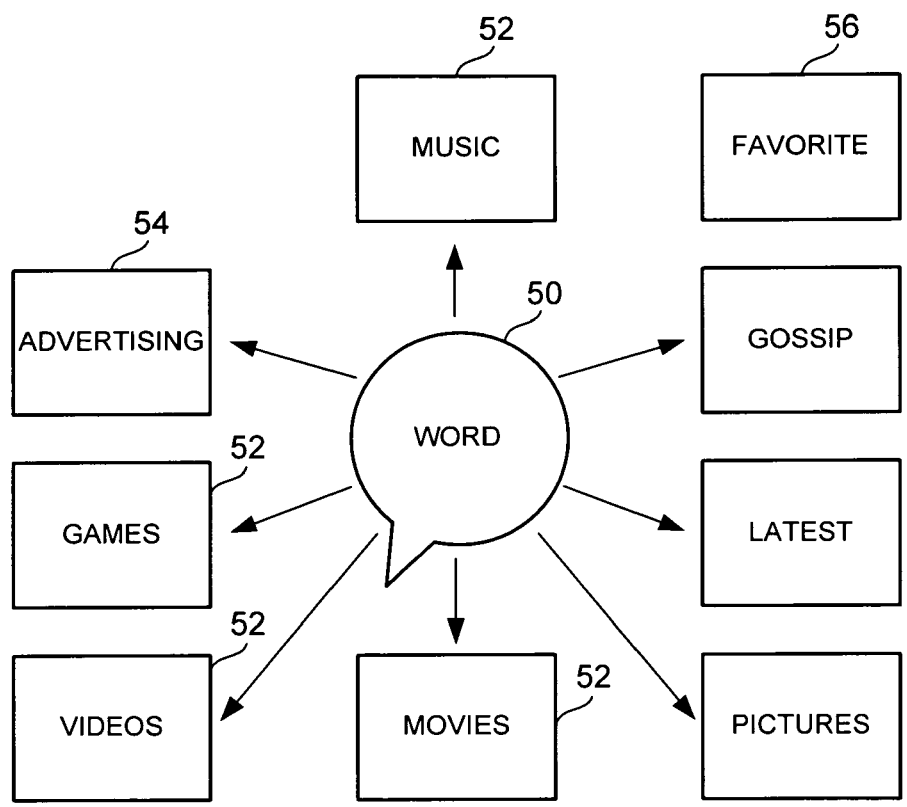
FIG. 1 illustrates a broad relationship between a word and different types of page modules, in accordance with one embodiment of the present invention.

The figures are provided in order to provide a thorough understanding of the present invention. The figures should not be construed as limiting the breath of the invention in any manner.

DETAILED DESCRIPTION

A system and apparatus for providing a navigation control in a "word page" is disclosed. A "word page" includes page modules that present content having specific context. Context can be defined based on types of media, or categories with a type of media. In one embodiment, a "vertical" defines a type of media, such as music, movies, communication, shopping, gaming, etc. Within each vertical, further contextual categories can be defined. For instance, within music, a context can be defined for types of music, each artist, etc. Thus, for purposes of clarity, the degrees and granularity by which types of context can be broken up or organized can grow over time, as further context definitions are generated for words. The "word page", as used herein, is a web page, that is constructed from one or more page modules. The page modules, as noted above, will each define a type of content, such as movie related content, music related content, picture related content, game related content, video related content, gossip related content, etc.

Although other interface control features can be used to enable word entry and analysis of an entered word for context, the example shown herein is a multi-function search box. The multi-function search box is used to enter or select a "word", and that word will be used to rearrange, construct or obtain contextually related content that will define the presentation, data, interactivity, images, etc., of specific page modules. Thus, the word page is a contained page, that dynamically changes, depending on the selected or entered word. A word page is therefore not a search engine or search interface that triggers a search of web links or external websites. To the contrary, the word page will contain or generate one or more page modules, and the data that is presented in each of the page modules dynamically changes or is updated over time or based on the entered "word" in the multi-function search box or the selection of specific "words" within a particular page module of the word page.

As used herein, to be "contextually related" means that a particular word, that may be entered by a user is related to other words or phrases. Other words or phrases may be related in terms of context, and the context means that there is some weaving together of words, in terms of meaning, subject, or a combination thereof. Thus, words that are contextually related to other words or phrases may be connected in terms of coherence. Still further, context can be thought of in terms of parts of a discourse that surround a word or passage and can throw light on the meaning of the entered word. Some words, that are considered contextually related may be defined based on some descriptive interrelation, dependence, or condition, based on a theme, environment, setting, event, group of similar media, similar activities, or combinations thereof.

In one embodiment, the shell of the "word page" includes a persistent navigation bar, a multi-function search box, and one or more page modules containing content that is generated based on a user entered word in the multi-function search box. The content in the page modules are contextually related to the user entered word.

In one example, information retrieved for the user entered or selected word is displayed in different types of page modules. For example, music related content is displayed in a music module; gossip related content is displayed in a gossip module, and so on. Various types of standard page modules are provided to display a set of popular content types. Unlike traditional search engines that provide links to possible information about a searched phrase, a web page (e.g., word page) is created for the entered word, as defined in one embodiment. Furthermore, the created word page provides content in a user friendly manner, as opposed to providing raw links to external web sites or web resources. Moreover, unlike traditional search engines that present links leading to possible unrelated information about a phrase, the word page hosts information either directly or contextually related to the entered word.

The persistent navigation bar has numerous functions. In one example, the persistent navigation bar provides a container for various dynamic controls. Each of these dynamic controls is associated with tools for providing an online collaboration environment in the word website. In another example, the dynamic controls may also be associated with productivity enhancement tools such as ready access to external resources that can be accessed by the users without leaving the word website. In yet another example, the controls in the persistent navigation bar are customizable by the users. Hence, a user may be able to rearrange the controls, add more controls and associate them to the internal and external resources of user's choice. The internal and external resources, as mentioned herein, include an Internet knowledge base, internal/external email boxes, IM engines, Online calendars, Internet websites and tools, user applications on the desktop and Internet, etc.

With this overview in mind, the following figures will illustrate example structure and functionality of the multi-function search box in word pages.

FIG. 1 illustrates a word 50 and various broad types of page modules 52, sponsored modules 54, and, favorite module 56. Word 50 relates to a concept, person, brand, etc and functions as a carrier of meaning. In one embodiment, the page modules 52 are categorized by a specific type of content type such as music, movie, gossip, latest, etc. New content types may be added to create a new page module 52. The sponsored module 54 is a special type of module that is provided or built specifically to host selected sponsored content associated with a particular word 50.

The favorite module 56 is also a special type of page module and is used for storing pointers to favorite page modules 52, in one embodiment. In another embodiment, various user defined contents or links to external resources, media, movie clips, albums, etc. may also be stored in a favorite module 56. In yet another embodiment, the favorite module 56 contains content specific to a particular user, wherein content is added to the favorite module 56 through user action.

As illustrated in FIG. 1, word 50 surrounded by page modules 52, sponsored modules 54, and favorite module 56, signifies that a quest for information related to the word 50 leads to generation of various types of page modules 52 and sponsored modules 54, each hosting a specific type of content. FIG. 1 further illustrates that generation of the word page revolves around selection of the word 50, i.e. information displayed through various page modules 52 is focused on the selected word 50. For example, selecting "popular" for word 50 will generate a word page with the most popular content for each respective page module (such as popular movie, popular music, popular celebrity, popular fashion, popular club, etc.). A new word page including a different set of page modules 52, is generated every time a new word 50 is selected. Hence, in above example, when the selection changes from "popular" to "newest", a new word page including page modules 52 such as "newest movies", "newest music album", "newest car models", etc. will be generated.

In one embodiment, the word website maintains a list of words 50 and a list of appropriate page modules 52 for various types of content related to each of the words 50 in the list. In one embodiment, words 50 and page modules 52 are maintained and updated by the information editors with the help of user's browsing patterns, latest stories about various celebrities, products, etc., various topics that users may be interested in, the latest news, etc. Content are grouped in different categories such as content related to a particular subject or word suitable or liked to a particular segment of users. In one embodiment, contents are regularly and continuously updated to keep up with the latest developments. In another embodiment, various types of contents are scanned and obtained from various electronic media sources automatically, based on context based search filters.

Figure 2:
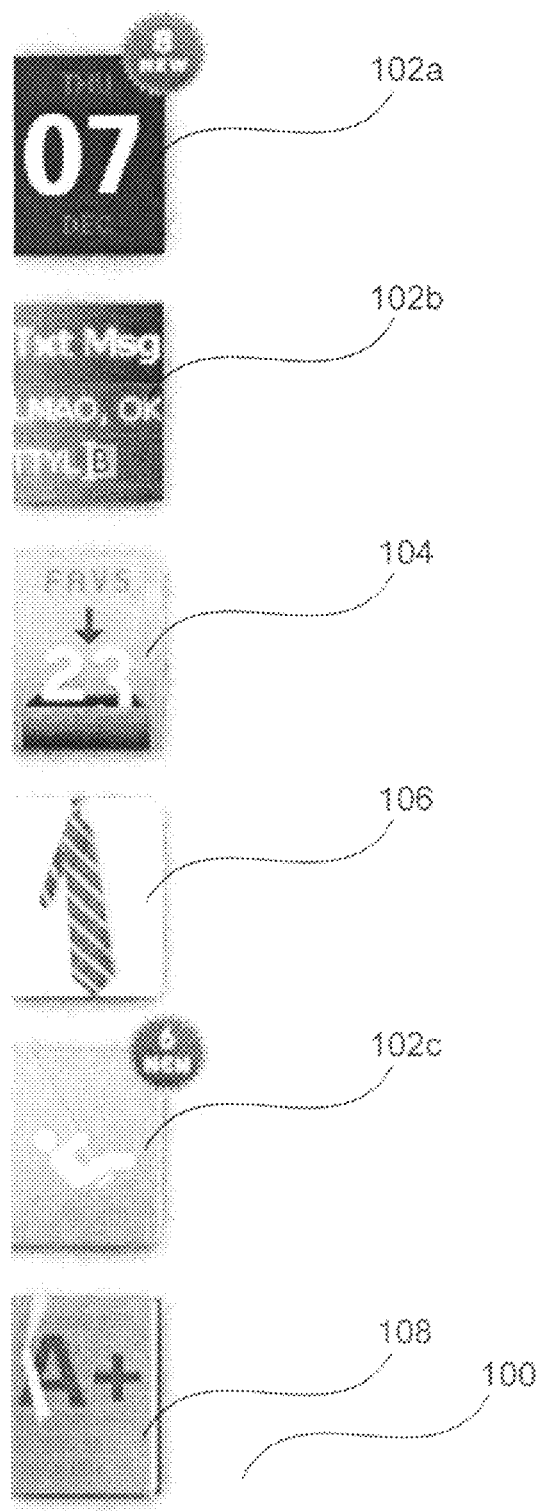
FIG. 2 illustrates a persistent navigation bar including various controls, in accordance with one embodiment of the present invention.

FIG. 2 illustrates a persistent navigation bar 100, in one embodiment. The persistent navigation bar 100 includes dynamic visual controls 102a, 102b, 102c. The persistent navigation bar 100 also includes a favorite module control 104 that is associated with a favorite module 56 of a user. When the favorite module control 104 is selected or clicked by the user, the favorite module 56 is displayed in the word page. In one embodiment, the favorite module 56 is appended at the end of the displayed page modules in the word page. In another embodiment, the favorite module 56 is inserted at the top of the word page. In yet another embodiment, the location of the favorite module 56 is configurable by the user. The favorite module 56 contains content that was tagged and added to the favorite module 56 by the user during user's previous visits to the word website.

In one embodiment, the user should to be registered and logged in for the word website to retrieve user's favorite module 56 from the persistent storage. In another embodiment, the word website uses the Internet browser cookies (or other markers) to track user's content tagging.

Still referring to FIG. 2. The persistent navigation bar 100 further includes a hide page control 106. The hide page control 106, when selected or clicked by the user, makes the page modules 52 in the word page visually disappear from the display screen, leaving only the persistent navigation bar 100 visible in the shell of the word page. This feature is geared toward privacy protection in that the user of the word page can hide the content of the word page quickly when someone walks by and could inadvertently look at the content of the word page. In one embodiment, the persistent navigation bar 100 also includes a knowledge control 108 which can be configured to connect to knowledge resources such as Yahoo Answers™. In another embodiment, the knowledge control 108 may be configured by the user to connect to other external resources such as online wikipedias, dictionaries, thesauruses, etc.

In one embodiment, the knowledge control 108 monitors the content of the word page to ascertain the subject context of user selected content in a page module of the word page. The user may select a specific content in the page module and click on the knowledge control 108 to explore the selected content or the subject matter of the subject content further, without leaving the word page. In another example, the knowledge control 108 may take the user directly to the associated external resource to find answers, meaning, or explanation of the selected content in the page module. In yet another example, the answer, meaning, or explanation may be retrieved from the associated external resource and displayed to the user in a separate pop-up window. In yet another example, the retrieved content from the external knowledge resource may be displayed in a new page module in the word page.

In one embodiment, the persistent navigation bar 100 is rectangular in shape. In another embodiment, the persistent navigation bar is oval in shape. In yet another embodiment, the persistent navigation bar 100 may take any shape so long as the persistent navigation bar 100 can be contained inside the word page without hindering the view to the page modules in the word page. In one embodiment, the persistent navigation bar 100 is opaque. In another embodiment, the persistent navigation bar 100 is transparent. In yet another embodiment, the persistent navigation bar 100 itself is invisible but the dynamic controls contained within the persistent navigation bar 100 are visible. In yet another embodiment, the visual properties of the persistent navigation bar 100 and the dynamic controls are user configurable.

In one embodiment, the dynamic controls 102*a-c*, 104, 106, 108 in the persistent navigation bar 100 are rectangular in shape. In another embodiment, the dynamic controls 102*a-c*, 104, 106, 108 are square in shape. In yet another embodiment, the dynamic controls 102*a-c*, 104, 106, 108 are circular in shape. In yet another embodiment, the dynamic controls 102*a-c*, 104, 106, 108 are oval in shape. In yet another embodiment, the dynamic controls 102*a-c*, 104, 106, 108 can take any shape so long as the dynamic controls 102*a-c*, 104, 106, 108 can be contained within the persistent navigation bar 100.

Figure 3:
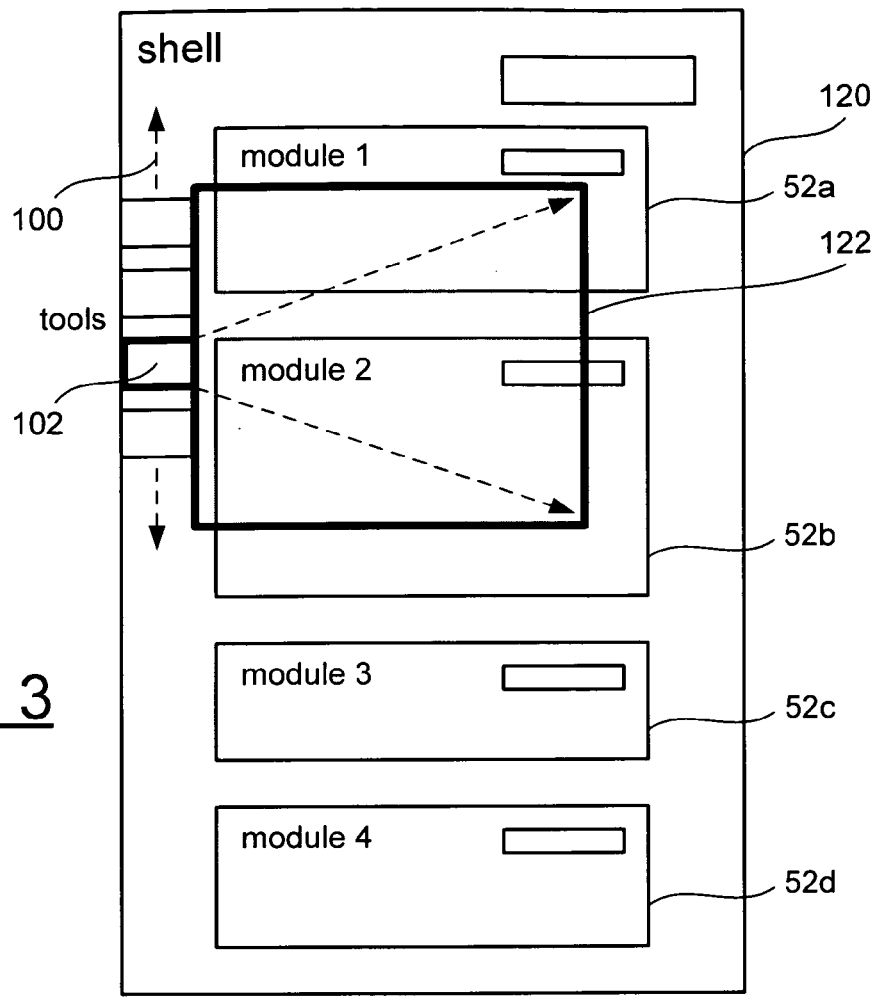
FIG. 3 illustrates physical placement of the persistent navigation bar in a word page and controls' ability to expand over the page modules in the word page, in accordance with one embodiment of the present invention.

FIG. 3 illustrates the shell 120 of a word page and a plurality of various types of page modules 52*a-d*. The shell 120 includes the persistent navigation bar 100 that includes a plurality of dynamic controls 102. In one embodiment, the shell 120 is a frame, a window, or a page that is configured to receive one or more navigation controls and one or more page modules. In one embodiment, the persistent navigation bar 100 is placed along the vertical perimeter edge of the shell 120. The persistent navigation bar can be moved up or down along the perimeter of the shell 120 by holding the mouse pointer on to the persistent navigation bar 100 and moving the mouse pointer up or down to a desired location. In another embodiment, the persistent navigation bar 100 is placed along the horizontal perimeter edge of the shell 120 and the persistent navigation bar 100 may be moved left or right to a user selected position on the display screen. In yet another embodiment, the persistent navigation bar 100 can be free floating inside of the shell 120.

Still referring to FIG. 3, in one embodiment, the dynamic controls 102 in the persistent navigation bar 100 expands to an appropriate size suitable to display content of the dynamic control 102 or the associated tool. When expanded, the dynamic control 102 creates an expanded portion 122 in the form of a window. The expanded portion 122 can thus overlie one or more page modules of the shell 120. Thus, the window of the expanded portion will, in one embodiment, lie over one or more modules.

In one embodiment, the expanded portion 122 can be solid. In another embodiment, the expanded portion 122 may be partially transparent to enable the content of the page modules underneath the expanded portion 122 to be partial visible. In still another embodiment, the expanded portion 122 is opaque. Also, the expanded portion 122 can have multiple stages of expansion (and thus different window configurations). For example, when the dynamic control 102 is clicked once, the expanded portion 122 may have a particular set of physical dimensions. When the dynamic control 102 is clicked again, while the dynamic control 102 is in the first stage of expansion, the physical dimensions of the expanded portion 122 can change to another set of physical dimensions, and so on.

Still referring to FIG. 3, the expanded portion 122, in one embodiment, shows a user interface of the associated tool. In another embodiment, a selected content is retrieved from the associated tool or external resource and displayed in the expanded portion 122. For example, if the dynamic control is associated to user's calendar that is hosted in an external resource such as Microsoft Outlook™, the expanded portion 122 may display the user interface of Microsoft Outlook™. In another example, the persistent navigation bar 100 will retrieve user's calendar "data" entries from Microsoft Outlook™ and display the content in a calendar control and custom user interface provided by the persistent navigation bar 100. Consequently, in this embodiment, the data can be presented in a format that is more user friendly than if entire native interfaces were imported in or displayed in a window. Still further, because one embodiment enables direct access to the data also residing in other applications, the handling of data changes through the dynamic control 102 enables for efficient data management and tracking of updates that can be populated back to the files used by the native applications.

Figure 4:
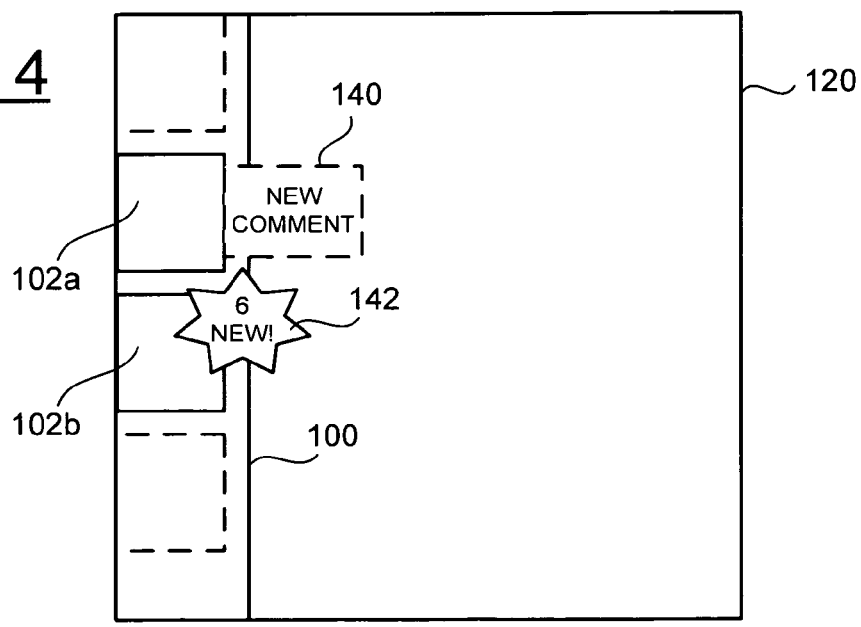
FIG. 4 illustrates features of the controls in the persistent navigation bar, in accordance with one embodiment of the present invention.

Referring now to FIG. 4. The dynamic controls 102, in one embodiment, provide visual notifications 140, 142 in various geometric shapes. In another embodiment, the visual notifications may be implemented using replacing icons on the dynamic controls 102 when a notification needs to be conveyed to the user. In yet another embodiment, a visual notification may be implemented using any technique capable of attracting attention of a user who is looking at the dynamic controls 102. These visual notifications do not require a user action. In stead, the visual notifications are based on monitoring of the external resources that are configured in the word website or in the persistent navigation bar 100. For example, the persistent navigation bar 100 may monitor user's one or more email boxes to notify the user if one or more new emails have arrived. In one embodiment, an audio notification may also be provided along with the visual notification 140, 142. The visual notifications 140, 142 may also display a snapshot of the content of the notification. For example, the visual notification 140,142 may display a list of newly arrived comments including comment writers' names or identification, or a number representing newly arrived emails, etc.

Figure 5:
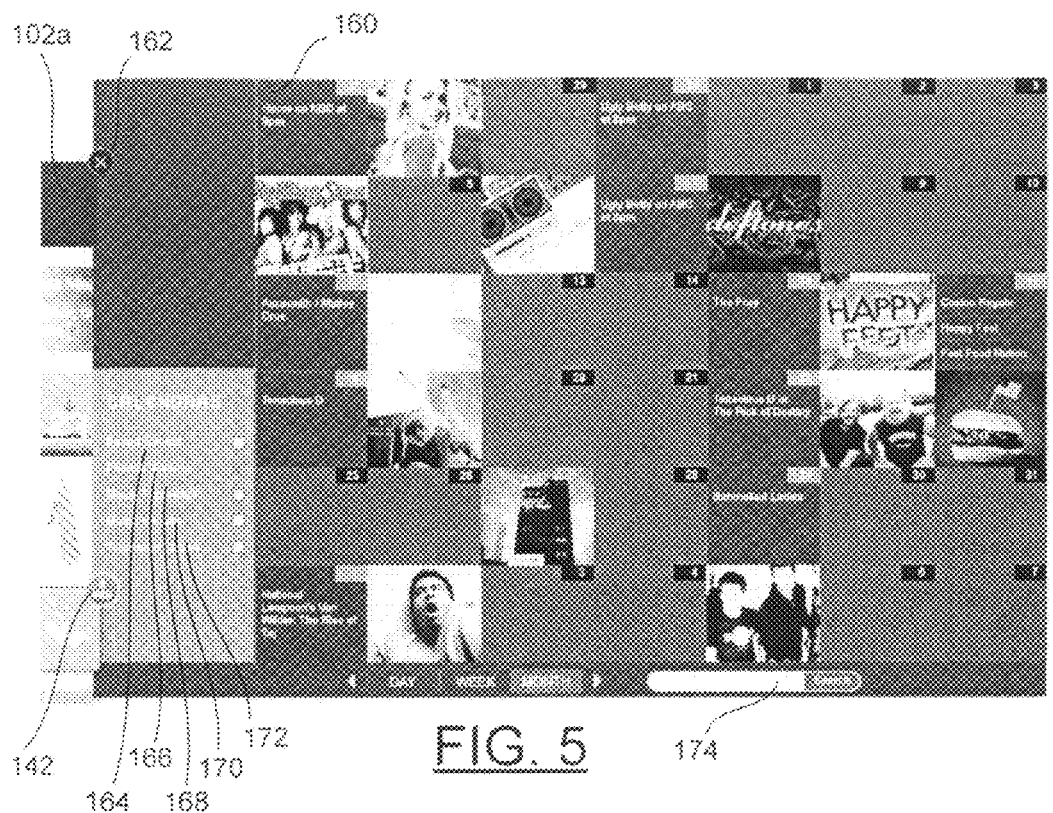
FIG. 5 illustrates a calendar control in an expanded mode, in accordance with one embodiment of the present invention.

FIG. 5 illustrates a calendar dynamic control 102*a*, in one embodiment. In one embodiment, the calendar dynamic control 102*a* expands 160 when the calendar dynamic control 102*a* is clicked or selected in the persistent navigation bar 100. The expanded calendar 160 may be closed by selecting the close button 162. In one embodiment, when the calendar dynamic control is clicked or selected in the persistent navigation bar 100, the calendar dynamic control 102*a* expands to show a list of calendar categories including Saved Events 164, Friends' Events 166, Movie Premiers 168, Movie Viewing 170, and Television Shows 172, etc. The user may add more categories of their choice. The user may also delete one or more calendar categories. The user may select one of these calendar categories to open event details in the selected calendar category.

Still discussing FIG. 5, the event details include time and date of the events, location of the events, and brief description of the event. In one embodiment, the event details may also include a picture related to the event. The events may be browsed by a month, a week, or a day. In one embodiment, using the search box 174, the events may be searched by keyword or keywords. In other embodiment, the events may be searched for contextually related events. For example, searching for "Justin" would also bring up any event related to "N-Sync" because "Justin" was a band member of "N-Sync", hence a contextually relationship exists. In one embodiment, when the calendar dynamic control 102*a* or any other dynamic control is in expanded state, the visual notifications 142 from other dynamic controls are not hidden from the view of the user.

Figure 6:
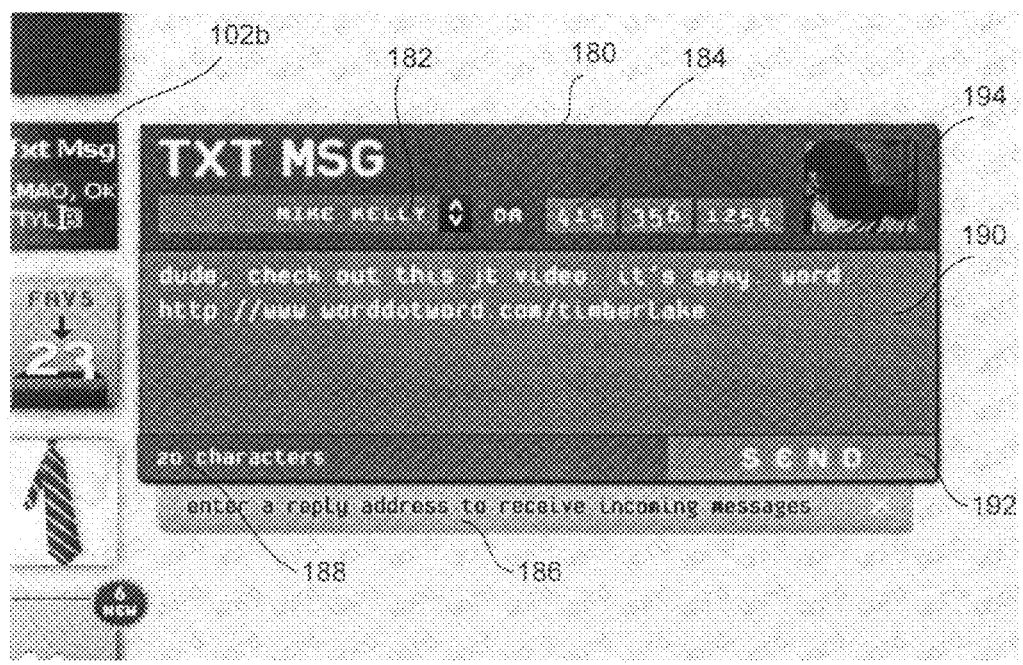
FIG. 6 illustrates a text message control in an expanded mode, in accordance with one embodiment of the present invention.

Moving on to FIG. 6, which illustrates a text messaging dynamic control 102*b*. Text messaging is getting more and more popular. Hence, providing a text messaging interface in the word website would allow users of the word website to stay on the word page in the world website and also send and receive text messages including instant messages. In one embodiment, a text message box 180 is opened when the text messaging dynamic control 102*b* is clicked on the persistent navigation bar 100. The text message box 180 includes a address bar 182 to select a recipient of the text message which is entered by the user in a message box 190. The recipient may be a user of an instant messaging (IM) platform such as Yahoo Messenger™, or could be a cell phone user having a text message receiving facility in the cell phone. In one embodiment, the user maintains a list of recipient by entering the names and receiving address (e.g. a phone number or a IM id, etc.). In another embodiment, the text messaging dynamic control 102*b* automatically stores the names and addresses of all outgoing text messages.

Still referring to FIG. 6, the text message box 180 also includes a picture placeholder 194, which shows the picture of the recipient. The picture is stored as a part of maintaining of the recipient list by the user. If there is no picture provided, a default picture or no picture is displayed in the picture placeholder 194. A text message can also be sent directly to a phone number 145. A send button 192 is provided to initiate text messaging sending process. The text message is entered in the message box 190. Since, many cell phone text messaging service providers limit number of characters in the text message being sent to a phone, a character counter 188 is provided to indicate a count of characters while the user enters the text message in the message box 190. In one embodiment, an entry bar 186 is provided to enable the user to enter a return address to which a reply, if any, to the text message being sent be sent. The return address could be a phone number or user's IM id including the IM platform identification.

Figure 7:
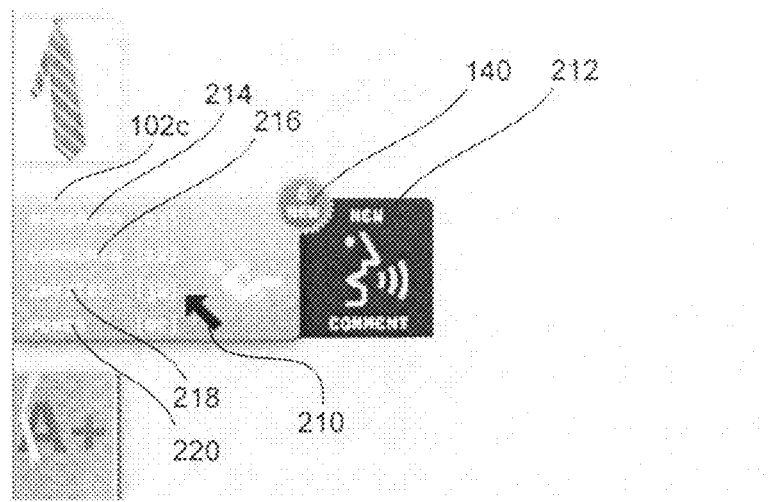
FIG. 7 illustrates a control to consolidate messages, comments, invites, and pokes, etc., in accordance with one embodiment of the present invention

FIG. 7 illustrates a message consolidation dynamic control 102*c*. In one embodiment, the message consolidation dynamic control 102*c* provides a consolidated or aggregated snapshot of the count of messages 214, comments 216, invites 218, and pokes 220. In one embodiment, the message consolidation dynamic control 102*c* is configurable to enable the user to add or remove one or more message categories from being monitored by the message consolidation dynamic control 102*c*. The message consolidation dynamic control 102*c* monitors various sources to retrieve received text messages for the user and comments that are entered by other users on the content selected by the user to be monitored by the message consolidation dynamic control 102*c*. The message consolidation dynamic control 102*c* also monitors invite messages that are sent by other users to the user inviting the user for a particular events or meetings. In one embodiment, the message consolidation dynamic control 102*c* also monitors poke messages to the user from other users. Poke messages are short messages indicating that the sender would like to be in communication with the user.

Still referring to FIG. 7, in one embodiment, the message consolidation dynamic control 102*c* displays counts of various types of messages sent to the user when a mouse pointer 210 is brought over the message consolidation dynamic control 102*c*. In another embodiment, the message consolidation dynamic control 102*c* may display the counts without any mouse pointer 210 action on the message consolidation dynamic control 102*c*. In one embodiment, a voice notification control 212 is provided to play an audio to inform the user that one or more new messages or comments, or, invites, or pokes have arrived.

Figure 8:
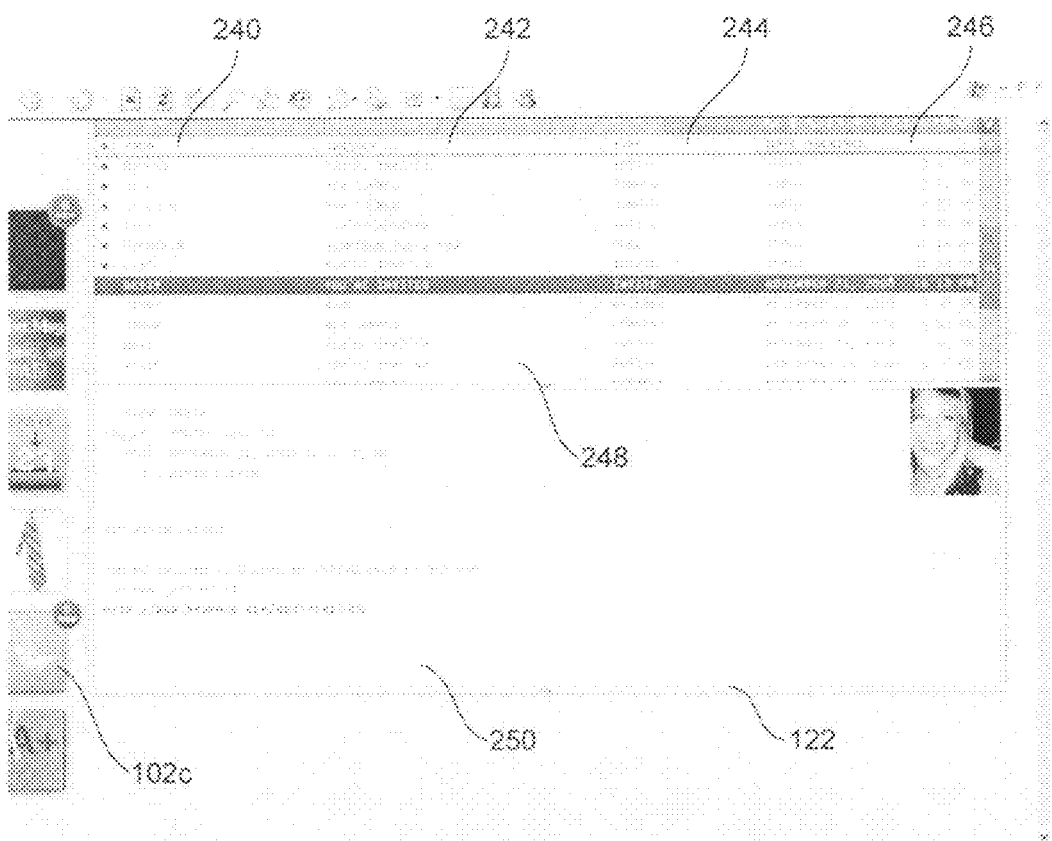
FIG. 8 illustrates the control to consolidate messages, comments, invites, and pokes, etc. in an expanded mode, in accordance with one embodiment of the present invention.

Referring now to FIG. 8, the message consolidation dynamic control 102*c* expands 122 to show a consolidated inbox that, in one embodiment, displays all received messages. In another embodiment, the consolidated inbox may also display invites, pokes and comments. The consolidated inbox includes from 240, subject 242, type 244, and date received 246 fields to display a list 248 of incoming messages, invites, comments, or pokes. A selected member of the list 248 may be displayed in the message box 250. In one embodiment, the message being displayed in the message box 250 may include one or more pictures.

A configuration framework is provided to enable configuring the dynamic controls, associating the dynamic controls to internal or external tools, etc. The configuration information, in one embodiment, is stored in a relational database. In another embodiment, the configuration information is stored in a operating system file. The configuration file may be stored in word website servers, or the configuration file may be stored in a server that is connected to the word website servers. The configuration information includes a list of dynamic controls to be loaded and displayed on the display screen when the persistent navigation bar 100 is loaded and displayed on the display screen. The configuration information also includes a mapping list that describes relationships between the dynamic controls and their respective association with any internal or external tool (e.g. a dynamic control 102*a* is associated with a calendar tool). The configuration information also includes parameters and their values related to the size, location, and shape of the persistent navigation bar 100 on the display screen.

In one embodiment, the persistent navigation bar 100 accesses the word website configuration stored in a relational database to get logged in user information to enable accessing user's email box or boxes, IM inbox or inboxes, etc. Furthermore, the persistent navigation bar 100 also accesses the relational database configured to maintain contextual relationships of the words to enable contextual search in the calendar dynamic control and in other user configured dynamic controls in the persistent navigation bar 100.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules, page modules, and, subsystems described in this document can be implemented using a programming language such as Flash, JAVA, C++, C, C#, Visual Basic, JAVA Script, PHP, XML, HTML etc., or a combination of programming languages. Commonly available application programming interface (API) such as HTTP API, XML API and parsers etc. are used in the implementation of the programming modules. As would be known to those skilled in the art that the components and functionality described above and elsewhere in this document may be implemented on any desktop operating system which provides a support for a display screen, such as different versions of Microsoft Windows, Apple Mac, Unix/X-Windows, Linux etc. using any programming language suitable for desktop software development.

The programming modules and ancillary software components, including configuration file or files, along with setup files required for installing the widget dock and related functionality as described in this document, are stored on a computer readable medium. Any computer medium such as a flash drive, a CD-ROM disk, an optical disk, a floppy disk, a hard drive, a shared drive, and an storage suitable for providing downloads from connected computers, could be used for storing the programming modules and ancillary software components. It would be known to a person skilled in the art that any storage medium could be used for storing these software components so long as the storage medium can be read by a computer system.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While this invention has been described in terms of several preferable embodiments, it will be appreciated that those skilled in the art upon reading the specifications and studying the drawings will realize various alternation, additions, permutations and equivalents thereof. It is therefore intended that the present invention includes all such alterations, additions, permutations, and equivalents as fall within the true spirit and scope of the invention.

What is claimed is:

1. A non-transitory computer-implemented method for presenting a navigation control inside of a shell of a word page, when said method is executed, the navigation control is defined, comprising:
   a plurality of dynamic controls defined as part of the navigation control, an associated dynamic control of the plurality of dynamic controls is associated with a tool and is configured to allow display of a user interface of the tool in an overlying window without leaving the word page, the shell of the word page includes,
      a plurality of page modules that are dynamically generated in response to user action related to a word that is entered into a field of the shell, each page module provided in the word page provides content that is contextually related to the word and each page module is categorized to include a different specific type of content that remains contextually related to the word;
      the navigation control being configured to move up or down along an edge of the shell to follow user movement of the plurality of page modules within the shell;
      the overlying window is configured to be defined over one or more of the plurality of page modules;
      wherein content of every page module in the plurality of page modules has some descriptive interrelated dependence to or from the word.

2. The navigation control as recited in claim 1, wherein the associated dynamic control is capable of expanding in size.

3. The navigation control located inside of the shell of the word page as recited in claim 2, wherein the associated dynamic control is capable of retrieving a snap shot of an information from the tool.

4. The navigation control located inside of the shell of the word page as recited in claim 3, wherein the associated dynamic control is capable of displaying the information.

5. The navigation control located inside of the shell of the word page as recited in claim 3, wherein the associated dynamic control is capable of indicating a change in the information.

6. The navigation control located inside of the shell of the word page as recited in claim 1, wherein the edge of the shell is a vertical perimeter edge of the shell and the page modules are offset from the vertical perimeter edge of the shell at a location of the navigation control.

7. The navigation control as recited in claim 6, wherein the associated dynamic control is associated with a calendar tool wherein the calendar tool is capable of displaying a calendar of events, the calendar of events including television shows, movie premiers, music events.

8. The navigation control as recited in claim 1, further comprising:
   a favorite module control to launch a favorite page module; and
   a hide page control to hide the word page.

9. The navigation control as recited in claim 3, wherein the associated dynamic control is associated with a text messaging tool to send a text message.

10. The navigation control as recited in claim 3, wherein the messages include text messages, invites, comments, and pokes, wherein pokes are short signals to indicate that an another user is inviting the user to communicate.

11. A computer-implemented method for handling a navigation control, the computer-implemented method comprising:
   providing the navigation control inside of a shell of a word page including a plurality of page modules that are dynamically created in response to a user action defining a word that is entered into a field of the shell, and the plurality of page modules include content that is contextually related to the word and each page module is categorized to include a different specific type of content that remains contextually related to the word and each page module having an identifiable boundary that contains the content of the page module;
   displaying the navigation control on the display screen to contain a plurality of dynamic controls in the shell of the word page;
   displaying the plurality of dynamic controls to display a user interface of tools associated with each of the plurality of dynamic controls, the user interface is configured to be displayed in an overlying window defined over one or more of the plurality of page modules, and the navigation control being configured to move up or down along an edge of the shell to follow user interaction with viewable ones of the plurality of page modules within the shell; and
   associating each of the plurality of dynamic control with the tools;

wherein content of every page module in the plurality of page modules has some descriptive interrelated dependence to or from the word.

12. A computer-implemented method for handling a navigation control as recited in claim 11, further comprising:
    retrieving a snapshot of information from an associated tool, the associated tool is associated with a dynamic control wherein the dynamic control is one of the plurality of dynamic controls; and
    displaying the snapshot of information on the dynamic control.

13. The computer-implemented method for handling a navigation control as recited in claim 12, further comprising:
    enabling the dynamic control to expand in size when a mouse pointer is brought over the dynamic control.

14. The computer-implemented method for handling a navigation control as recited in claim 11, wherein the associating further includes associating one of the plurality of dynamic controls with a mobile phone text messaging provider.

15. The computer-implemented method for handling a navigation control as recited in claim 11, wherein the associating further includes associating one of the plurality of dynamic controls with a hide page operation wherein the hide page operation is used to make the word page disappear from a display screen on which the word page is being displayed.

16. A non-transitory computer readable media having program instructions for executing a shell that provides functionality to a navigation bar located inside of the shell of a word page, the computer readable media comprising:
    program instructions for generating a plurality of page modules dynamically defined in response to user action defining a word, and the plurality of page modules defined within the shell and include content that is contextually related to the word and each page module is categorized to include a different specific type of content that remains contextually related to the word and each page module having an identifiable boundary that contains the content of the page module;
    program instructions for displaying the navigation bar to contain a plurality of dynamic controls when rendered in the shell of the word page and the navigation control bar is configured to move up or down along an edge of the shell to follow user interaction with viewable ones of the plurality of page modules within the shell;
    program instructions for displaying the plurality of dynamic controls to display a user interface of tools associated with each of the plurality of dynamic controls, the user interface is configured to be displayed in an overlying window defined over one or more of the plurality of page modules; and
    program instructions for associating each of the plurality of dynamic control with the tools,
    wherein the content of every page module in the plurality of page modules has some descriptive interrelated dependence to or from the word.

17. The computer readable media as recited in claim 16, further comprising:
    program instructions for retrieving a snapshot of information from an associated tool, the associated tool is associated with a dynamic control wherein the dynamic control is one of the plurality of dynamic controls; and
    program instructions for displaying the snapshot of information on the dynamic control.

18. The computer readable media as recited in claim 17, further comprising:
    program instructions for enabling the dynamic control to expand in size when a mouse pointer is brought over the dynamic control.

19. The computer readable media as recited in claim 16, wherein the associating further includes program instructions for associating one of the plurality of dynamic controls a mobile phone text messaging provider.

20. The computer readable media as recited in claim 16, wherein the associating further includes program instructions for associating one of the plurality of dynamic controls with a hide page operation wherein the hide page operation is used to make the word page disappear from a display screen on which the word page is being displayed.

* * * * *